UNITED STATES PATENT OFFICE.

WILHELM WOLTERS, OF MAGDEBURG-BUCKAU, GERMANY.

PROCESS OF MAKING CITRATE SOLUBLE PHOSPHATES.

SPECIFICATION forming part of Letters Patent No. 721,489, dated February 24, 1903.

Application filed February 11, 1898. Serial No. 669,996. (No specimens.)

*To all whom it may concern:*

Be it known that I, WILHELM WOLTERS, a subject of the Grand Duke of Brunswick, residing at Magdeburg-Buckau, Kingdom of Prussia, German Empire, have invented certain new and useful Improvements in Artificial Manure, of which the following is a specification.

This invention relates to improvements in the manufacture of artificial manures, and has for its object the conversion of phosphates of calcium, such as phosphorites and bone materials, into a state in which they are most efficient in promoting the development and growth of plants.

The new process for converting the phosphorites into compounds which are entirely citrate soluble consists in melting together the silicates of the alkaline earths and of the alkalies with phosphorite at a high temperature, not less than 1,200° centigrade. With the potassium compounds white heat must be employed, and with the soda compounds yellow heat may suffice. Thus compounds of the phosphor-silicic acid with the alkalies and the alkaline earths are produced which are completely soluble in the well-known Wagner citrate solution. Analysis of the compounds has shown a content of 15.38 per cent. of phosphoric acid, of which 15.28 per cent. is citrate soluble phosphoric acid, and, furthermore, 15.14 per cent. (citrate soluble) potassa.

In working the new process the phosphorite or bone material is melted with the silicates of the alkalies and of the alkaline earths. The silicate of alkali employed may be in the form of glass fragments or it may be produced from the alkali salts such as found in Stassfurt, or sulfate of soda and sand may be employed. If the silicates of the alkaline earths are used alone, the phosphorites will be rendered far less soluble than if the silicates of the alkalies and the alkaline earths are used together. Furthermore, in using the silicates of the alkaline earths alone the process of rendering the compound soluble cannot be worked without loss of phosphoric acid. The double silicate of phosphor-silicic acid in which both groups of the bases are contained is far more easily worked than the one which contains bases of the alkaline earths alone. Only by using the two named bodies simultaneously the high citrate solubility without any loss of phosphoric acid is obtained.

The proportions of the ingredients will depend upon the quality of the phosphorites employed. With phosphorites of high percentage a suitable proportion of mixture will be one hundred parts, by weight, of phosphorite, sixty parts, by weight, of silicate of alkaline earths, and thirty parts, by weight, of silicate of alkali. If instead of silicate of soda silicate of potassium is used—as, for instance, in using the Stassfurt salts of potassium—the proportion of the silicate of the alkali may be somewhat increased. Small fluctuations in the composition are of no great consequence. If, however, a considerable amount of magnesia is present, the addition of silicic acid has to be somewhat reduced. In using glass fragments the desired proportions of silicic acid and bases may be obtained by the addition of carbonate of lime.

The citrate soluble compound will be formed at a high temperature only, at not less than 1,200° centigrade, it being absolutely necessary that said temperature be sufficiently high to reduce the ingredients to a molten mass. If silicate of sodium is employed, a yellow heat will be sufficient. If silicate of potassium is employed, a white heat must be reached.

In working the process ovens such as the well-known Siemens ovens may be employed the bottoms of which may be formed of materials containing phosphoric acid.

The following further example of the mixture has been used with most satisfactory results, in which the product after being completely fluxed has been found to be ninety-nine per cent. soluble in a weak citrate solution: one hundred parts of phosphorites, eighty parts of chalk, eighty-four parts of silicate.

I claim as my invention—

1. The herein-described process of manufacturing citrate soluble phosphates by heating a mixture of natural phosphates, silicates of the alkalies and silicates of the alkaline earths to a temperature of not less than 1,200° centigrade at which the said materials are converted into a homogeneous mass of a fluid molten state which when cold is perfectly soluble in citrate solutions.

2. The herein-described process of manufacturing citrate soluble phosphates by heating a mixture of phosphorite, chalk and silicates to a temperature of not less than 1,200° centigrade at which the mixture becomes a thin fluid molten mass.

3. The herein-described process of manufacturing citrate soluble phosphates by heating a mixture of about one hundred parts of phosphorite, about eighty parts of chalk, eighty-four parts of silicate to a temperature at which the mixture becomes a thin fluid molten mass.

In testimony that I claim the foregoing as my invention I have signed my name in presence of two subscribing witnesses.

WILHELM WOLTERS.

Witnesses:
MARGARET DIEDERICH,
JULIA ALICE WOLTERS.